United States Patent [19]

Brackman, Jr.

[11] Patent Number: 4,494,182
[45] Date of Patent: Jan. 15, 1985

[54] COMMUTATION DETECTION APPARATUS AND METHOD

[75] Inventor: William D. Brackman, Jr., Salem, Va.

[73] Assignee: General Electric Company, Salem, Va.

[21] Appl. No.: 458,109

[22] Filed: Jan. 14, 1983

[51] Int. Cl.³ .............................................. H02M 1/08
[52] U.S. Cl. ..................................... 363/63; 340/645; 363/54; 363/87; 363/129
[58] Field of Search ................... 324/158 SC; 363/63, 363/54, 81, 87, 129; 340/645, 657

[56] References Cited

U.S. PATENT DOCUMENTS

| | | | |
|---|---|---|---|
| 3,654,541 | 4/1972 | Kelley et al. | 363/54 |
| 3,806,906 | 4/1974 | Young | 363/54 |
| 3,865,438 | 2/1975 | Boksjo et al. | 363/54 |
| 4,167,698 | 9/1979 | Podlewski | 363/87 |

FOREIGN PATENT DOCUMENTS

| | | | |
|---|---|---|---|
| 57-98019 | 9/1982 | Japan . | |
| 3568 | 1/1983 | Japan | 363/54 |

OTHER PUBLICATIONS

Arrillaga et al., "Fast ON/OFF Detection of Silicon-Controlled Rectifiers and Its Influence on Convertor Controllability," IEEE Trans. on Ind. Electr. and Contr. Instr., vol. IECI-26, No. 1, pp. 22-26, (Feb. 1979).

Primary Examiner—William H. Beha, Jr.
Attorney, Agent, or Firm—Arnold E. Renner

[57] ABSTRACT

A method and apparatus for use in conjunction with a power conversion system employing a plurality of switching elements for controlling the electrical power supplied to a load from a source includes the sensing of the instantaneous voltage furnished to the load and providing a signal representing the time derivative of the sensed voltage. The derivative signal thus developed is compared with predetermined reference values to develop output signals which are logically combined to provide a final signal representative of the instant in time at which one of the switching elements is commutated (turned off).

8 Claims, 4 Drawing Figures

COMMUTATION DETECTION APPARATUS AND METHOD

BACKGROUND OF THE INVENTION

The present invention relates generally to power conversion apparatus and more particularly to a method and apparatus for precisely determining the instant in time at which each of several controlled switching devices of a controllable power conversion bridge is commutated (rendered non-conductive).

In the discipline of power conversion; e.g., converting alternating current (AC) to direct current (DC) or DC to AC, it is customary to employ a bridge arrangement of semiconductor devices (e.g., thyristors or transistors) to control the magnitude and/or frequency of electrical power delivered from a source to the load. A typical load in such an application is an electrical motor. In such conversion systems it is often necessary to determine the precise instant in time when the individual semiconductor devices are commutated (i.e., rendered non-conductive or turned off). Such a requirement is found, for example, in the invention which is the subject of U.S. patent application Ser. No. 458,108, "Method for Adaptive Conduction Control in a Power Converter" by W. D. Brackman, Jr., et al., filed Jan. 14, 1983, (assigned to the assignee of the present invention).

The problem of determining the time of commutation, particularly when the converter output current becomes discontinuous, is complicated by disturbances which are present in the converter output. These disturbances can arise from a large variety of causes including source disturbances, load disturbances and most especially those caused by the commutation of the devices of the bridge or by the commutation of switching devices of other bridges connected to the same source. While a number of commutation detection schemes are available, most tend to be inaccurate or very expensive. For example, current transformers can be used in the lines connecting the converter to the load; but, current transformers are magnetic devices and tend to be expensive as well as highly susceptible to electrical disturbances or electrical noise. It is also known in the art to detect the voltage across each of the several semiconductors (e.g., thyristors) of a bridge circuit and to determine the conductive state of each of these devices by that voltage. This, obviously, requires a large amount of detection circuitry and hence is relatively expensive.

SUMMARY OF THE INVENTION

It is, therefore, an object of the present invention to provide an improved commutation detection scheme.

It is a further object to provide a method and apparatus for determining the precise instant in time at which switching device of a converter bridge becomes non-conductive.

It is another object to provide a method and circuit to detect the time of bridge device commutation using readily available signals.

It is still another object of the present invention to provide a method and circuitry to determine the commutation times of bridge switching devices which use readily available signals and with a minimum amount of circuitry.

The foregoing and other objects are achieved, in accordance with the present invention, by providing, for use with a power conversion system of the type employing a plurality of controlled switching elements which control the electrical power supply from a source to a load, a scheme for determining the instant in time when each of the switching devices is rendered non-conductive. This scheme employs, first, the provision of a signal which is indicative of the instantaneous voltage supplied to the load from the source. In response to this signal there is provided a second signal which is proportional to the derivative, with respect to time, of the first signal. This derivative signal is compared to appropriate reference signals to provide logic signals which are indicative of positive and negative rates of change in the first signal in excess of predetermined magnitudes. In response to these latter signals, logic means provide a final output signal indicative of the actual instant in time representing the commutation of a bridge switching device.

BRIEF DESCRIPTION OF THE DRAWING

While the present invention is described in particularity in the claims annexed to and forming a part of this specification, a better understanding of the invention can be had by reference to the following description taken into conjunction with the accompanying drawings in which:

DETAILED DESCRIPTION

Figure 1:
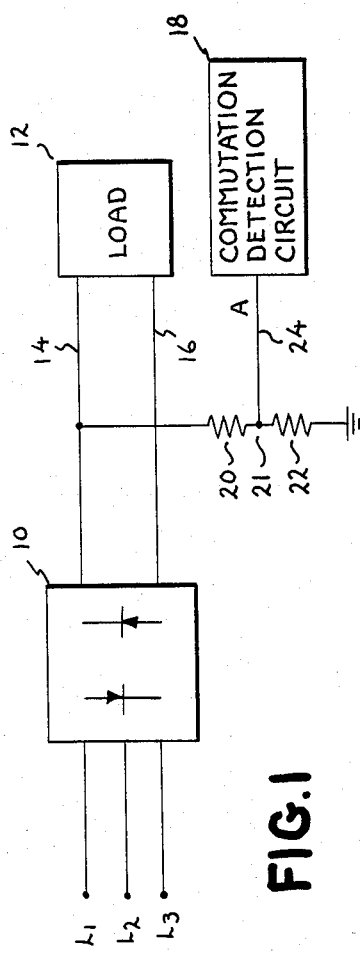
FIG. 1 is a major block diagram showing a suitable environment for the subject invention.

FIG. 1 illustrates a suitable environment for the employment of the present invention. As shown, a three-phase power source illustrated by lines $L_1$, $L_2$ and $L_3$ is connected by way of a suitable power converter 10 to a load 12 by way of lines 14 and 16. Power converter 10 may be of any suitable type; but, as is common in today's state of the art conversion apparatus, is preferably a bidirectional thyristor bridge arrangement, of the type as is well known in the art, which selectively supplies relatively positive and negative DC voltages to the load 12. Load 12 may, of course, be of any type but most commonly would be a direct current motor. A commutation detection circuit 18 of the present invention receives as an input signal a voltage signal representative of that supplied from the converter 10 to the load 12. As such, there is shown a voltage divider comprised of two series resistors 20 and 22 which are connected between the power line 14 and ground. The junction of these two resistors, junction 21, is connected by way of line 24 to the commutation detection circuit 18 to provide a signal which, in this specification, is designated A.

Figure 2:
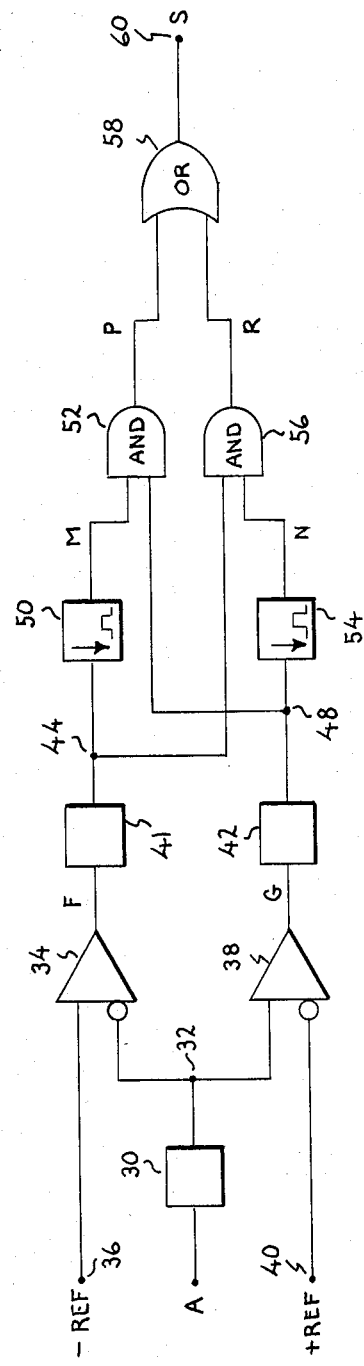
FIG. 2 is a major block diagram illustrating the present invention in its preferred embodiment.
Figure 3:
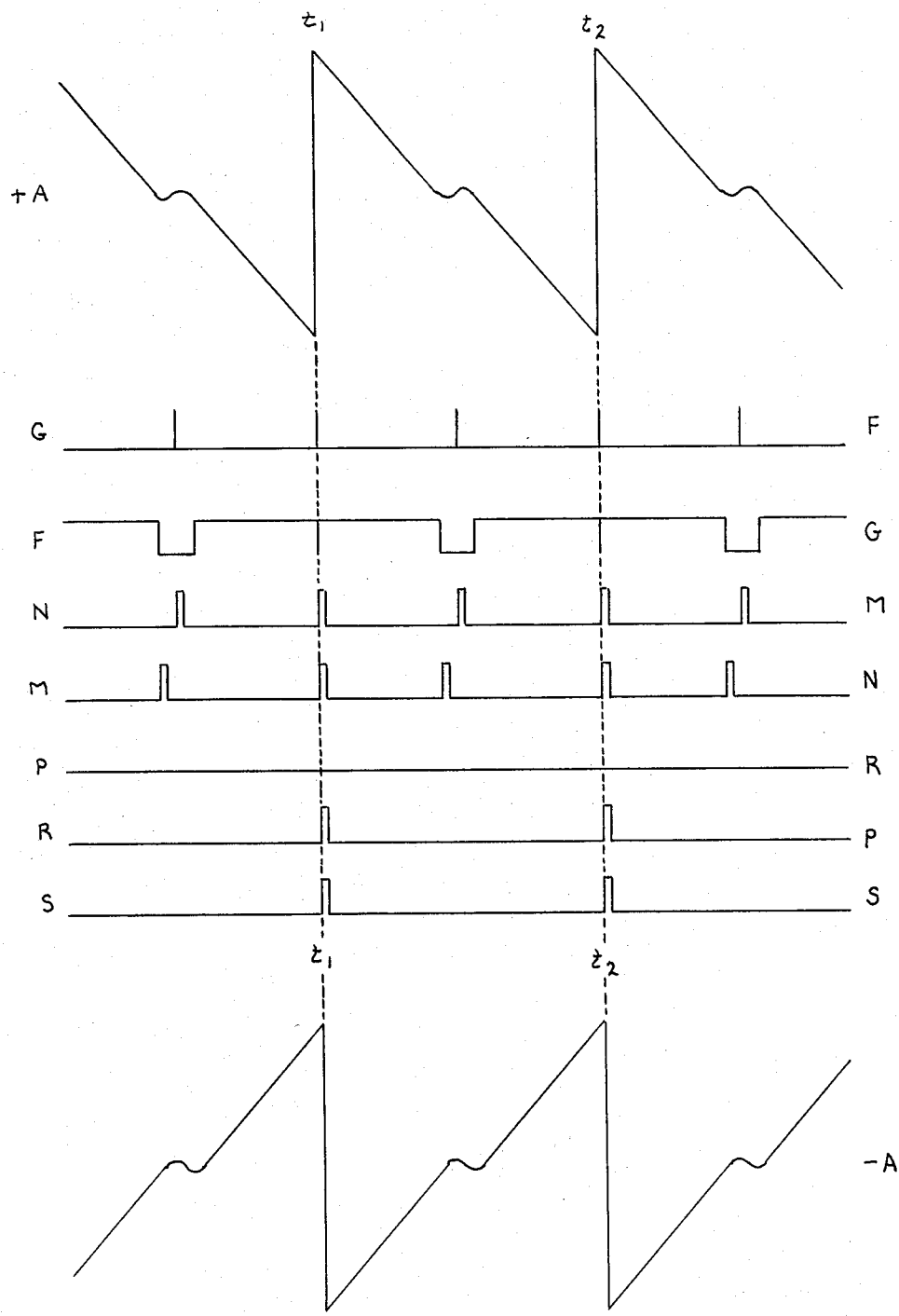
FIG. 3 shows wave shapes useful in the understanding of the present invention; and, FIG. 4 is a schematic diagram illustrating one possible implementation of the block diagram system illustrated in FIG. 2.

FIG. 2 is a major block diagram of the circuitry of the present invention in its preferred embodiment. It is believed that FIG. 2 and the operation thereof is best understood when taken in conjunction with the wave forms shown in FIG. 3. In FIG. 3, the top wave form (+A) and the letter designations at the lefthand side correspond to similarly designated signals within FIG. 2 and are for what is arbitrarily here termed as the forward direction of power being supplied from the converter 10 to the load 12 (FIG. 1). The bottom wave form labeled −A and the designations to the right of FIG. 3 are those which correspond to the opposite, or what may be here termed the reverse, direction of operation of the converter 10. Thus, by way of example, wave form G in FIG. 3 in the forward direction or bridge operation will correspond to wave form F in the reverse direction. It should also be noted that the +A and −A wave forms (generically referred to herein as the A wave form) are illustrated as having a step or discontinuity in the center portion such as would typically result from a commutation of another bridge arrangement which is also connected to the source lines $L_1$, $L_2$ and $L_3$. These discontinuities are to be considered as typical and representative of disturbances which occur within the overall system.

Referencing now specifically FIG. 2, it is seen that the A signal is applied to a first order differentiating circuit 30 which provides at its output, junction 32, a signal which is representative of the first derivative of the input signal A. This signal at junction 32 is applied to each of two comparator circuits 34 and 38. The signal at junction 32 is applied to the inverting input of comparator 34 which has, as its second input, a negative reference signal (−REF) derived from a suitable source (not shown) applied at terminal 36. Comparator 38 has the signal at junction 32 applied to its non-inverting input. The inverting input of comparator 38 is connected to terminal 40 which has applied thereto a positive reference voltage (+REF).

The output of comparator 34 is the F signal as is illustrated in FIG. 3. Assuming forward operation of the converter unit 10, it is seen that the F signal will drop from a relatively high to a relatively low value each time that the signal at junction 32 ceases to be more negative than the −REF signal, indicating that the rate of change of voltage in the A signal is less negative than a predetermined value. In a similar manner, the output of comparator 38 is the G signal and it is seen that the output of this comparator will go from a low to high level each time the signal at junction 32 goes more positive than +REF indicating that the rate of change in the voltage signal is more positive than a predetermined value. The F and G signals are applied, respectively, to two low pass filter networks 41 and 42 which serve to remove high frequency disturbances such that the basic F and G signals, respectively, appear at circuit nodes 44 and 48.

The signal at node 44 is applied to a first monostable multivibrator (one shot) 50 which provides a pulse output, M, which goes from a low to a high value for a predetermined duration beginning at the leading edge of each of the negative pulses of the F signal. In a similar manner, the signal at node 48 is applied to a second monostable multivibrator 54 whose output signal N will be a positive going pulse of predetermined duration beginning at the trailing edge of each of the positive going pulses of the G signal. The M signal serves as one input to a first AND gate 52 which has as its second input G signal from node 48. The input conditions of AND gate 52 are only satisfied if a rapid and significant change in the polarity (− to +) of the rate of change of the A signal voltage causes the G signal to become high during the width of the M signal pulse. The N signal is applied as one input to a second AND gate 56 whose second input is the F signal from node 44. The input conditions of AND gate 56 are only satisfied if a rapid and significant change in polarity (+ to −) of the rate of change of the A signal voltage causes the F signal to become high during the width of the N signal pulse.

The outputs of AND gates 52 and 56, designated respectively P and R, are furnished to an OR gate 58 which will provide an output signal (S) at terminal 60 with each commutation of a bridge switching device; i.e., at time $t_1$ and $t_2$ of FIG. 3. Thus it is seen that the difference between the +REF and −REF values serves as a region of electrical noise immunity to reject small values of rate of change in the A signal while the width of the M and N signals rejects slow reversals of rate of change in the A signal. As earlier indicated, operation of the bridge 10 in the reverse direction is shown by the −A signal at the bottom of FIG. 3 taken with the right-hand designations of the several wave shapes of that figure.

The implementation just described is for use with a reversing bridge, that is, a conversion bridge arrangement which is capable of providing power to the load in both directions, here described as the forward and reverse directions. Use of the present invention in a power conversion system which requires only a single direction of power to the load would not require all of the circuitry shown in FIG. 2. Specifically, in such a unidirectional system, one of the multivibrators, one of the AND gates and the OR gate would not be required. As an example, assuming operation in only what has here been defined as the forward direction, and with reference to FIG. 2, multivibrator 54, AND gate 56 and OR gate 58 could be omitted. The output signal S would then be comprised of the P signal.

Figure 4:
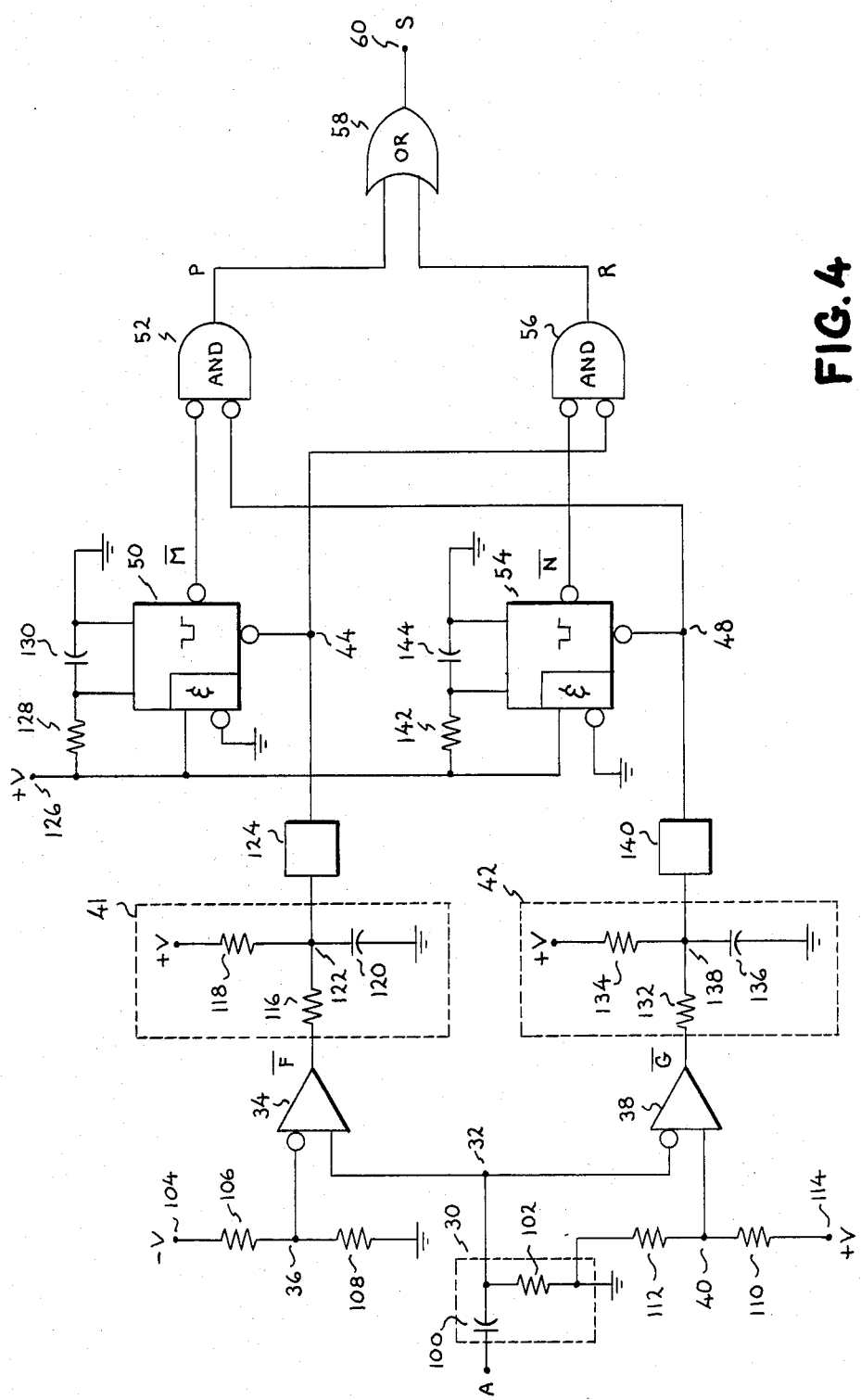

FIG. 4 illustrates in greater detail one possible implementation of the block diagram depiction of FIG. 2. In FIG. 4, like components and circuit connections have been designated, insofar as is practical, with the same designations as used in FIG. 2. It should be noted, however, that the implementation of FIG. 4 is not a pure one-to-one correspondence to that in FIG. 3 since commercially available components dictate the use of what is commonly referred to as negative logic whereas the implementation as described with respect to FIG. 2 was using positive logic. As such the various signals of FIG. 4 will be inverted and are shown with the conventional "not" notation; e.g., $\overline{F}$.

With these thoughts in mind and with reference now to FIG. 4, it is seen that the A signal is applied to the differentiating circuit 30 which may be comprised of a capacitor 100 and a resistor 102. The A signal is applied to one plate of capacitor 100, the other plate of which is connected to junction 32 and to one end of resistor 102, the other end of which is connected to ground. The signal at junction 32, the first derivative of the A signal, is applied to the non-inverting input of comparator 34, the inverting input of which is connected to terminal 36. Terminal 36 is supplied with a reference signal derived from a negative potential (−V) applied at terminal 104 by way of a voltage divider comprised of resistors 106 and 108. Terminal 36 is intermediate resistors 106 and 108 which are connected between the terminal 104 and ground. The output of comparator 34 is, in this case, designated $\overline{F}$.

In a manner similar to that described above, comparator 38 has applied to its inverting input the signal at junction 32 while its non-inverting input receives a signal from terminal 40. Terminal 40 is the common point of two resistors 110 and 112 which are connected between a source of positive potential (+V) at junction 114 and ground. The output of comparator 38 is signal $\overline{G}$.

The $\overline{F}$ signal at the output of comparator 34 is applied to filter network 41. Filter network 41 includes an input resistor 116 connected between comparator 34 and node 122. A series network of a resistor 118 and a capacitor 120 is connected between a source of positive potential +V and ground. The common point of resistor 118 and the capacitor 120 is node 122. Node 122 is, in turn, connected to a logic buffer 124 which serves in the capacity of better defining the signal applied thereto. Specifically, the logic buffer works as a comparator to better define its input signal and may be, for example, that commercial component commonly designated as a 74LS14 which is available from numerous manufacturers such as the National Semiconductor Corp. The output of buffer 124 is applied to circuit node 44 which serves as the input to monostable multivibrator 50. Multivibrator 50 may be any suitable commercially available multivibrator such as that designated by the common commercial designation 74LS123 which is also available from, inter alia, National Semiconductor Corp. The circuitry in FIG. 4, for purposes of completeness, also shows a positive potential +V being applied to a terminal 126 and further includes a resistor 128 and a capacitor 130 connected in series between terminal 126 and ground. The two plates of the capacitor are connected to the monostable multivibrator 50 for purposes of determining the output pulse width of that multivibrator. The output of the monostable multivibrator, signal $\overline{M}$, is furnished as one input to an inverting AND gate 52.

In a manner similar to that just described, the $\overline{G}$ signal is applied to filter network 42 which employs resistors 132 and 134 and a capacitor 136 connected in a configuration substantially identical to that described with respect to filter 41. The signal at a node 138 of filter 42 is applied to a second logic buffer 140, which may be identical to that defined as buffer 124, and the output of the buffer 140 is applied to node 48, the input to the second multivibrator 54. In the manner similar to that earlier described, the pulse width of the multivibrator 54 may be determined by an input circuit comprising resistor 142 and capacitor 144. The output of multivibrator 54, signal $\overline{N}$ is applied as one input to a two input inverting AND gate 54.

The second input to AND gate 52 is the signal at node 48; i.e., essentially the $\overline{G}$ signal. The second input to AND gate 54 is the signal from node 44, the $\overline{F}$ signal. The output of AND gates 52 and 54 are, respectively, the P and R signals which are applied to OR gate 58 to provide at junction 60 the S signal earlier described.

As was the case with the FIG. 2 depiction, the showing of FIG. 4 is for a reversing converter application and, if only single direction operation is required, the corresponding components of FIG. 4 to those discussed with respect to FIG. 2 may be omitted.

Thus, it is seen that there has been shown and described an apparatus and method which utilizes signals readily available from a power conversion system and which will accurately and inexpensively determine the commutation points of each of the several switching devices of the power conversion bridge.

While there has been shown and described what is at present to be considered to be the preferred embodiment of the present invention, modifications thereto will readily occur to those skilled in the art. It is not desired, therefore, that the invention be limited as specific circuit shown and described and it is intended to cover within the appended claims all such modifications as fall within the true spirit and scope of the invention.

What is claimed is:

1. For use with a power conversion system of the type employing a plurality of controlled switching elements for controlling the electrical power supplied from a power source to a load, circuit means for determining an instant in time when each of said switching devices is rendered non-conductive comprising:
   means to provide a first signal indicative of the instantaneous voltage supplied to said load from said source;
   (b) means responsive to said first signal to produce a second signal proportional to the derivative, with respect to time, of the said first signal;
   (c) means to provide first and second reference signals;
   (d) first and second comparator means responsive to said second signal and, respectively, to said first and second reference signals to selectively provide first and second output signals indicative of prescribed changes in said second signal; and,
   (e) logic means responsive to said first and second output signals to provide a final output signal indicating said instant in time.

2. The invention in accordance with claim 1 wherein said logic means includes means for performing an AND function.

3. The invention in accordance with claim 2 wherein said logic means includes a monostable multivibrator for developing an intermediate signal of predetermined duration to which said means for performing an AND function is responsive.

4. The invention in accordance with claim 1 wherein said logic means includes first and second AND gates for respectively receiving cross coupled representations of first and second output signals and an OR gate for providing said final output signal in response to output from said AND gates.

5. For use with a power conversion system of the type employing a plurality of controlled switching elements for controlling the electrical power supplied from a power source to a load, circuit means for determining an instant in time when each of said switching devices is rendered non-conductive comprising:
   (a) means to provide a first signal indicative of the instantaneous voltage supplied to said load from said source;
   (b) means responsive to said first signal to produce a second signal proportional to the derivative, with respect to time, of the said first signal;
   (c) means to provide first and second reference signals;
   (d) first and second comparator means responsive to said second signal and, respectively, to said first and second reference signals to selectively provide first and second output signals indicative of changes in said second signal;
   (e) means respectively responsive to said first and second output signals to respectively provide third and fourth output signals of predetermined duration;
   (f) first AND means to provide an AND function output in response to said first and third output signals;
   (g) second AND means to provide an AND function output in response to said second and fourth output signals; and, (h) OR means responsive to the outputs of said first and second AND means to provide a final output signal indicative of said instant in time.

6. The invention in accordance with claim 5 wherein said means to provide said third and fourth output signals includes monostable multivibrators.

7. A method for determining the instant time in which each of several switching devices of a power conversion system supplying a controlled output from a power source to a load becomes non-conductive comprising the steps of:

(a) developing a first signal indicative of the instantaneous voltage supplied from said source to said load;

(b) producing a derivative signal proportional to the time derivative of said first signal;

(c) providing first and second reference signals;

(d) comparing said derivative signal with, respectively, said first and second reference signals to provide first and second output signals indicative of the changes in said derivative signal; and, (e) logically combining said first and second output signals to provide a final output signal indicative of said instant in time.

8. A method for determining the instant time in which each of several switching devices of a power conversion system supplying a controlled output from a power source to a load becomes non-conductive comprising the steps of:

(a) developing a first signal indicative of the instantaneous voltage supplied from said source to said load:

(b) producing a derivative signal proportional to the time derivative of said first signal;

(c) providing first and second reference signals;

(d) comparing said derivative signal with, respectively, said first and second reference signals to provide first and second output signals indicative of the changes in said derivative signal;

(e) developing, in response to said first and second output signals, third and fourth output signals of predetermined duration; and, (f) providing in response to the simultaneous occurrence of either of said first and third output signals or said second and fourth output signals a final signal indicative of said instant in time.

* * * * *